United States Patent [19]
Kurisu

[11] Patent Number: 5,526,528
[45] Date of Patent: Jun. 11, 1996

[54] ABNORMAL TRANSMISSION STOPPING CIRCUIT FOR TRANSMITTER

[75] Inventor: Yoshikazu Kurisu, Ichihara, Japan

[73] Assignee: Uniden Corporation, Chiba, Japan

[21] Appl. No.: 233,580

[22] Filed: Apr. 26, 1994

[30] Foreign Application Priority Data

Jan. 21, 1994 [JP] Japan .................................. 6-005267

[51] Int. Cl.⁶ .................................. H04B 1/04; H02H 7/20
[52] U.S. Cl. ........................ 455/117; 455/115; 455/126; 455/127; 330/207 P; 330/298
[58] Field of Search .................................. 455/126, 127, 455/115, 117, 108, 67.1; 330/298, 207 P; 340/661, 664; 324/126

[56] References Cited

U.S. PATENT DOCUMENTS

| | | | |
|---|---|---|---|
| 4,761,824 | 8/1988 | Saito | 455/127 |
| 4,859,967 | 8/1989 | Swanson | 455/117 |
| 4,878,034 | 10/1989 | Gross et al. | 330/298 |
| 5,271,043 | 12/1993 | Fouche et al. | 455/102 |
| 5,365,201 | 11/1994 | Shih et al. | 330/298 |

FOREIGN PATENT DOCUMENTS

| | | |
|---|---|---|
| 59-228 | 1/1984 | Japan . |
| 1-144823 | 6/1989 | Japan . |
| 5-55936 | 3/1993 | Japan . |
| 5-95295 | 4/1993 | Japan . |

*Primary Examiner*—Reinhard J. Eisenzopf
*Assistant Examiner*—Doris To
*Attorney, Agent, or Firm*—Lowe, Price, LeBlanc & Becker

[57] ABSTRACT

An abnormal transmission stopping circuit for use in a transmitter including a base band signal processing circuit, an amplitude modulator which modulates the amplitude of a carrier signal in accordance with a base band signal, and a transmission amplifier which amplifies a signal modulated by the amplitude modulator. The stopping circuit includes an electric current detecting circuit which detects a power supply current to the transmission amplifier, and a comparator which generates and supplies a transmitting function stopping signal to the base band signal processing circuit when the detected power supply current exceeds a threshold value.

8 Claims, 7 Drawing Sheets

ABNORMAL TRANSMISSION STOPPING CIRCUIT FOR TRANSMITTER

FIELD OF THE INVENTION

The present invention relates to an abnormal transmission stopping circuit for preventing transmission of unnecessary electric waves by a transmitter.

BACKGROUND OF THE INVENTION

In a transmitter based on an amplitude modulation system, when any trouble such as a failure of a circuit occurs, abnormal modulation is executed, which may result in transmission of unnecessary electric waves. Transmission of unnecessary electric waves give undesirable effects over other communications.

Figure 6:
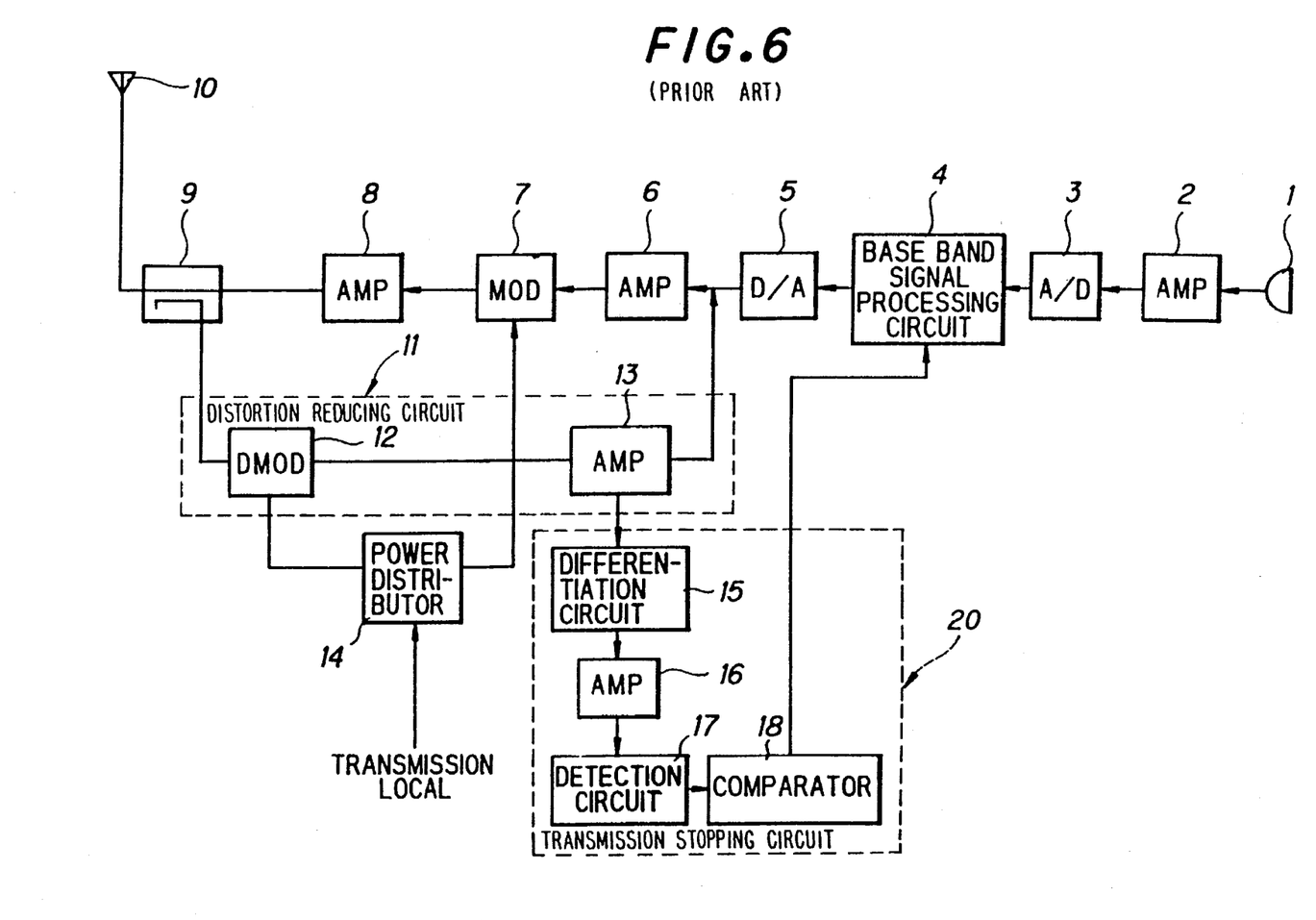
FIG. 6 is a block diagram illustrating a transmitter having the conventional type of abnormal transmission stopping circuit.

FIG. 6 shows configuration of a transmitter based on an orthogonal modulation system which is a sort of amplitude modulation system. An aural signal inputted from a microphone 1 is amplified by an microphone amplifier 2, and then is converted to an A/D convertor 3. The digital signal is processed in a base band signal processing circuit 4, and then converted to an analog signal by a D/A convertor 5. The analog signal is amplified by a modulation amplifier 6, and then is subjected to an orthogonal modulation by an orthogonal modulator 7. The signal to be modulated is amplified by an transmission amplifier 8, and the electric waves are transmitted via a directive coupler 9 from an antenna 10.

A distortion reducing circuit 11 comprises a demodulator 12 and an amplifier 13, takes out only progressive waves from the transmission amplifier 8 by using a directive coupler 9, demodulates and amplifies the progressive waves, and then feedbacks the waves to the modulation amplifier 6 to reduce distortion of the transmitted signal.

A transmission local (carrier) is added via a power distributor 14 to the modulator 7 and the demodulator 12 respectively.

In a transmitter employing an orthogonal modulation system therein, as it is important to accurately maintain a phase, only progressive waves each not including reflected waves are taken out from a signal fed back through the distortion reducing circuit 11, and for this reason the directive coupler 9 is used.

In a transmitter .based on the orthogonal modulation system as described above, when the transmitter is working in the normal state, distortion of a transmitted signal is small, and width of the spectrum is extremely small.

Figure 7:
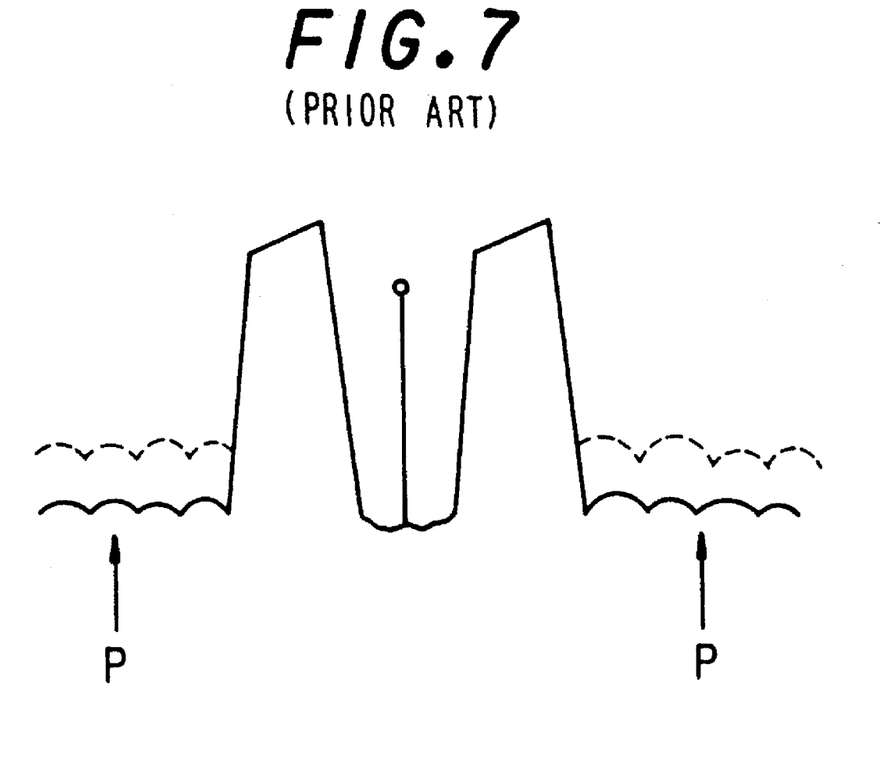
FIG. 7 shows a spectrum of a transmission signal from a transmitter based on the orthogonal modulation system.

FIG. 7 shows a spectrum of a transmitted signal based on the orthogonal modulation system. When the transmitter is working in the normal state, distortion of a signal is small, a spectrum (indicated by a solid line) at a point P generated by an modulated signal when it is assumed that the signal to be modulated by two carriers crossing each other at right angles comprises an I modulated signal and a Q modulated signal is extremely small. When a fault occurs in the transmitter, an electric power at point P generated according to the I modulated signal increases as shown by the dotted line. Namely the spectrum becomes wider. This change is detected by an abnormal transmission stopping circuit 20, a transmitting function of the transmitter is stopped, and transmission of unnecessary electric waves due to a fault of operation of the circuit is prevented.

Concretely the abnormal transmission stopping circuit 20 comprises a differentiation circuit 15, an amplifier 16, a detector circuit 17, and a comparator 18, differentiates output from the amplifier 13 in the differentiation circuit 15, amplifies the output with the amplifier 16, detects the output in the detector circuit 17, and inputs the electric waves into the comparator 18. In the comparator 18, when output from the detector circuit 17 exceeds a threshold value, it is regarded that the spectrum is widening, and a transmitting function stopping signal is generated with operation of the base band signal processing circuit 4 stopped.

The conventional type of abnormal transmission stopping circuit as described above has the shortcomings as described below.

(1) The circuit configuration is complicated.

(2) In such a case as where a modulating function is accidentally disabled with only a balance of an orthogonal modulator lost and only a transmission local (carrier) is transmitted with a full power, the faulty state of the transmitter can not be detected because the spectrum is not expanded. In this case, unnecessary electric waves are transmitted and other communications are interfered.

SUMMARY OF THE INVENTION

It is an object of the present invention to provide a method of stopping abnormal transmission by a transmitter free from the defects as described above.

It is another object of the present invention to provide a circuit in which the method of stopping abnormal transmission according to the present invention can be implemented.

It is still another object of the present invention to provide a transmitter incorporating the abnormal transmission stopping circuit according to the present invention.

The abnormal transmission stopping circuit according to the present invention which stops transmission of unnecessary electric waves generated due to abnormal operation of a transmitter based on the amplitude modulation system comprises an electric current detecting circuit for detecting an electric current for transmission in the transmitter, and a comparator which generates a transmitting function stopping signal when an electric current value detected by the electric current detecting circuit exceeds a threshold value.

With the present invention, it is possible in a transmitter based on the amplitude modulation system to detect any circuit fault by monitoring a power supply current to a transmission amplifier for preventing unnecessary electric waves from being transmitted due to the circuit fault. For this reason, interference to other communications due to transmission of unnecessary electric waves can be prevented.

Especially, even if a modulation balance is lost in an orthogonal modulator and transmission local is transmitted with full power, the transmission current increases, so that a power supply current to the transmission amplifier increases. For this reason, transmission of unnecessary electric waves can be prevented even in such a state as described above.

Furthermore, with the present invention, an overcurrent in a transmission amplifier is detected, so that it is possible to protect a transmission amplifier.

Other objects and features of this invention will become understood from the following description with reference to the accompanying drawings.

DESCRIPTION OF THE PREFERRED EMBODIMENTS

Figure 1:
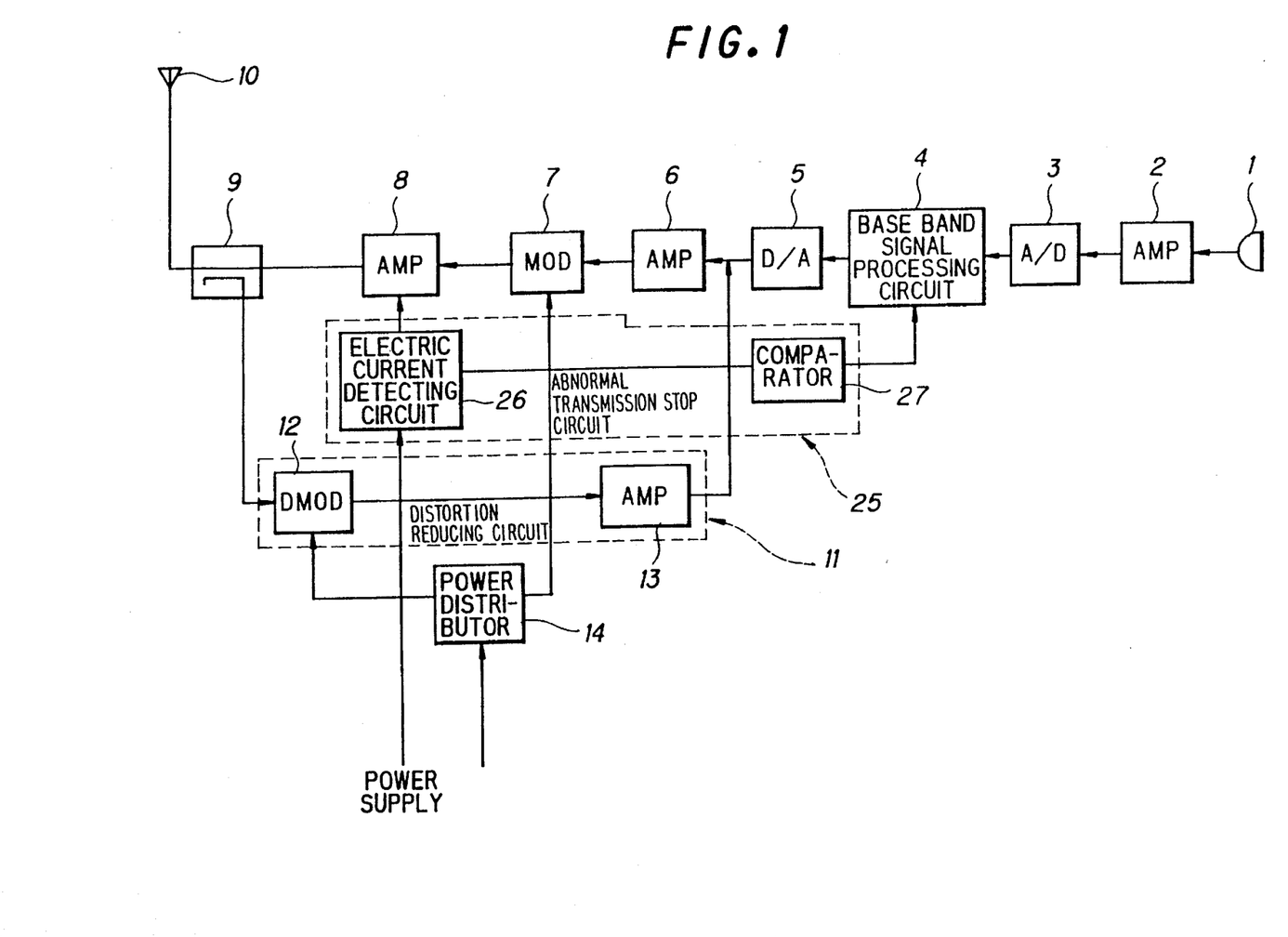
FIG. 1 is a block diagram illustrating a transmitter having an abnormal transmission stopping circuit according to the present invention.

FIG. 1 is a block diagram illustrating configuration of a transmitter based on the orthogonal modulation system having an abnormal transmission stopping circuit according to the present invention. The basic configuration of a transmitter having a distortion reducing circuit is the same as that as shown in FIG. 6, and the same reference numbers are used.

Namely the transmitter comprises a microphone 1, a microphone amplifier 2, an A/D convertor 3, a base band signal processing circuit 4, a D/A convertor 5, a modulation amplifier 6, an orthogonal modulator 7, a transmission amplifier 8, a directive coupler 9, a distortion reducing circuit 11 comprising a demodulator 12 and an amplifier 13, and a power distributor 14.

The abnormal transmission stopping circuit 25 according to the present invention comprises an electric current detecting circuit 26 which detects an electric current being supplied from a power source to the transmission amplifier 8 and a comparator 27 which compares an electric current value detected by the electric current detecting circuit 26 to a threshold value, and when the detected electric current value exceeds the threshold value, the result of comparison is fed back to the base band signal processing circuit 4 so that transmission is stopped.

If any trouble occurs in the transmitter and a spectrum of a transmission signal becomes wider, a sum of energy in the spectrum, namely a transmission power becomes substantially large, and an electric current supplied from a power source to the transmission amplifier 8 becomes about two times larger than that in the normal operation.

Even if a balance in the orthogonal modulator 7 is lost, only a carrier wave is sent, and the spectrum does not become wider, the electric current consumed by the transmission amplifier becomes about two times larger or more than that during the normal operation.

As described above, if there is any faulty circuit, the electric current consumed in the transmission amplifier 8 always increases, so that it is possible to stop abnormal transmission by monitoring the electric current value detected by the electric current detecting circuit 26.

FIG. 2 to FIG. 5 show concrete circuit configuration of main circuits in the transmitter in FIG. 1.

Figure 2:
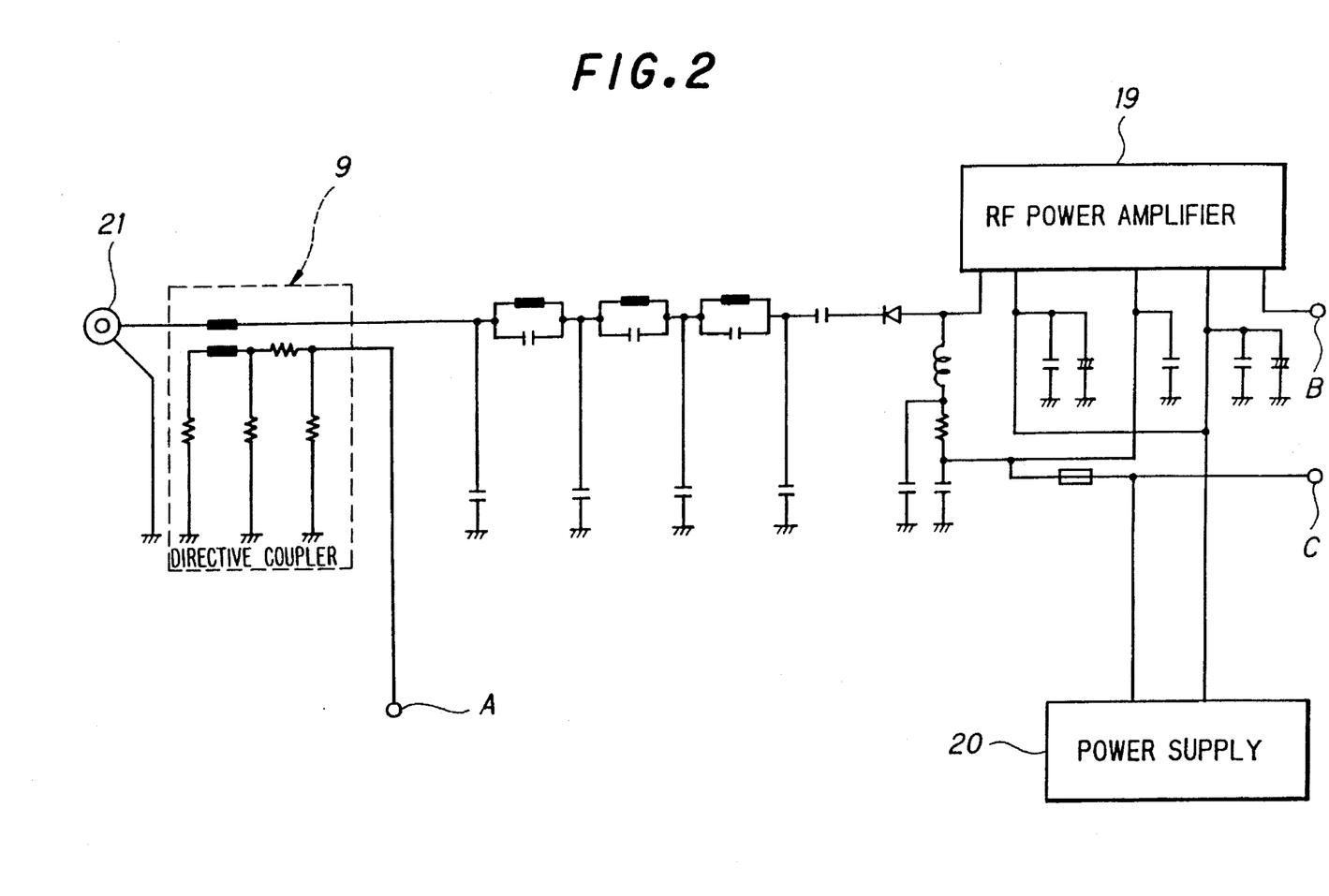
FIG. 2 is a circuit diagram for a main circuit of the transmitter shown in FIG. 1.

FIG. 2 is a circuit diagram illustrating a portion of the directive coupler 9 and the transmission amplifier 8 respectively. In this figure, the reference numeral 19 indicates an RF power amplifier, 20 indicates a power supply, and 21 indicates an antenna connection terminal. A progressive wave output terminal A of the directive coupler 9 is connected to the progressive wave input terminal A in FIG. 4, a signal input terminal B of the RF amplifier 19 is connected to the output signal terminal B in FIG. 3, and a power terminal C is connected to the power terminal C in FIG. 3.

Figure 3:
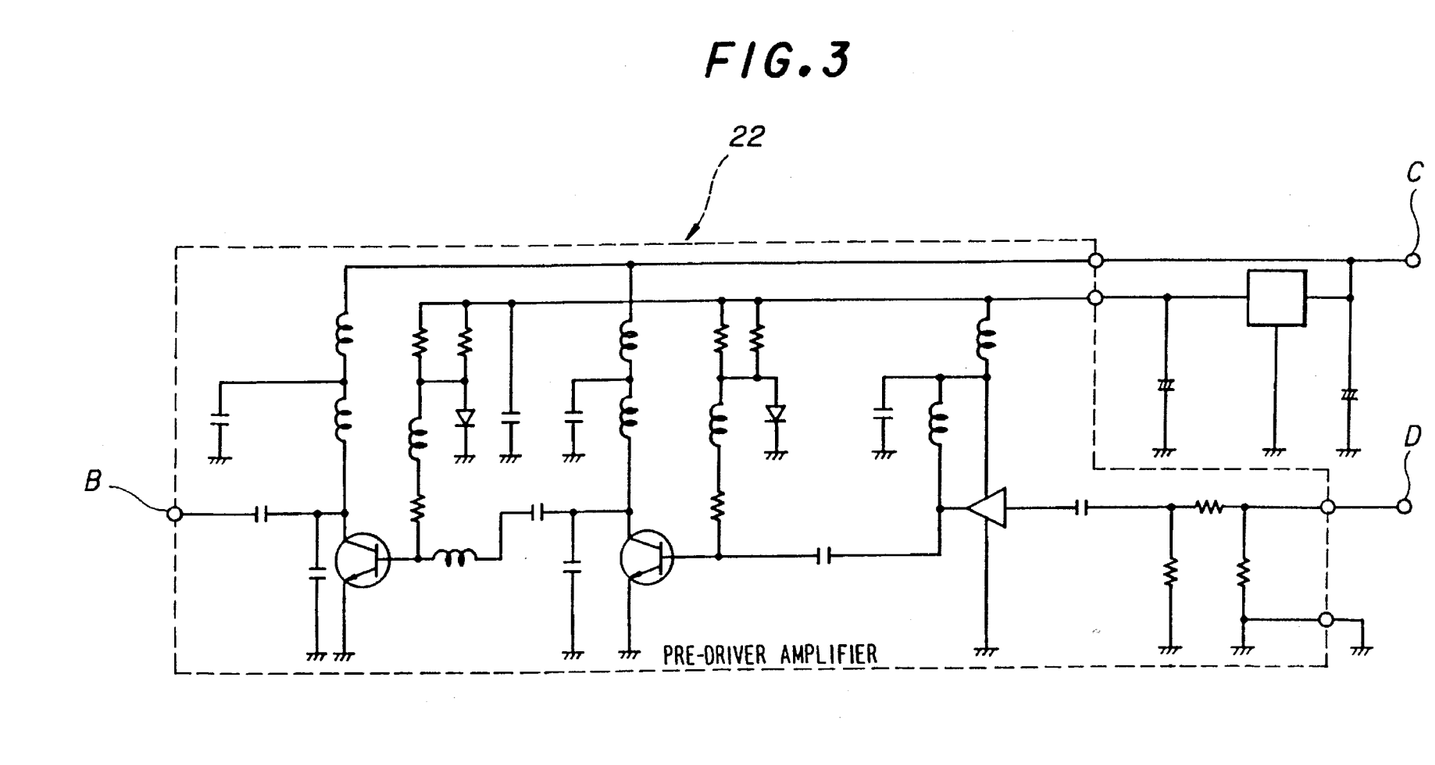
FIG. 3 is a circuit diagram for the main circuit of the transmitter shown in FIG. 1.

FIG. 3 is a circuit diagram illustrating a portion of the transmission amplifier 6. In this figure, the reference number 22 indicates a pre-driver amplifier, and a modulated signal input terminal D is connected to the modulated signal output terminal in FIG. 4.

Figure 4:
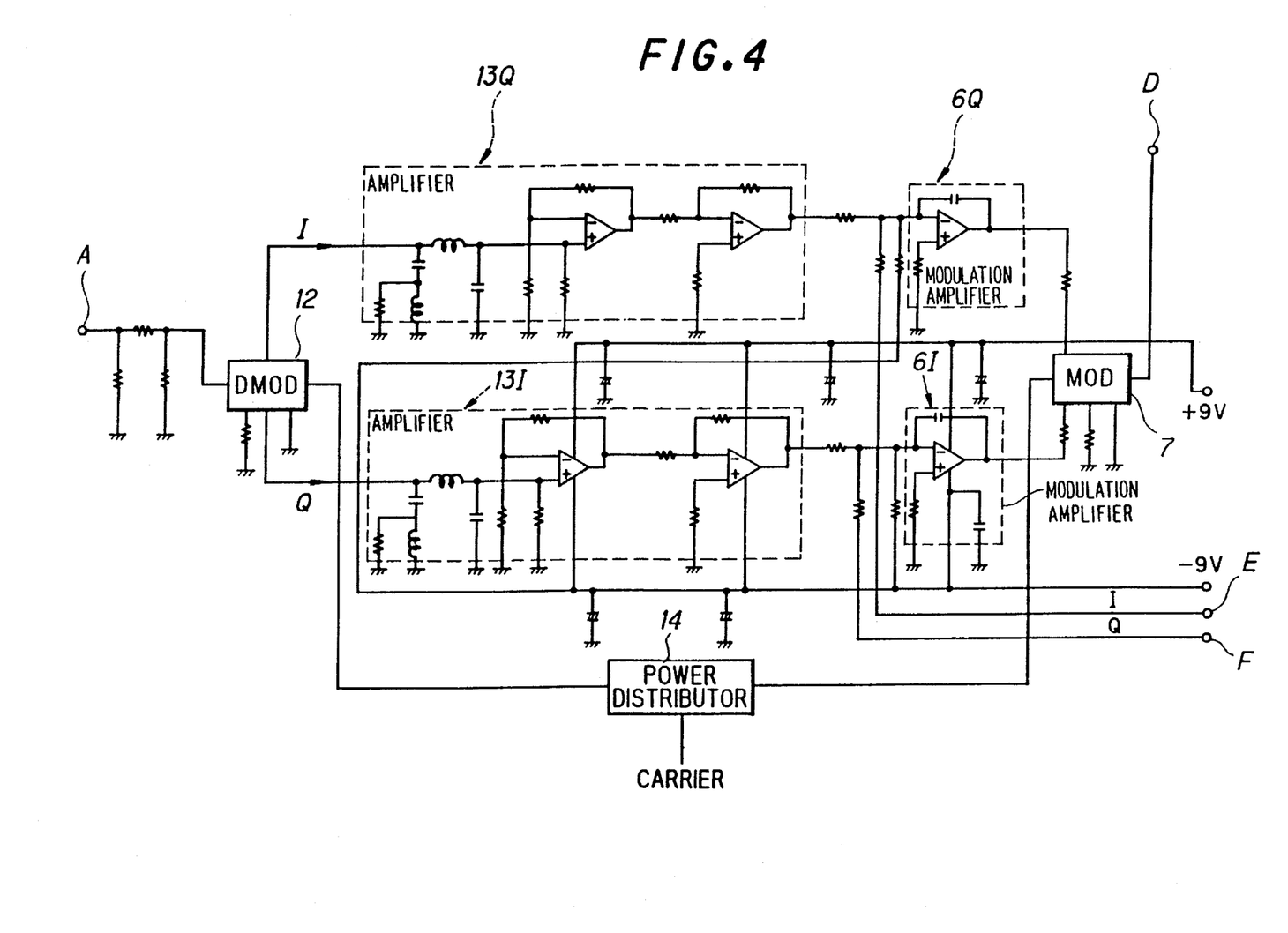
FIG. 4 is a circuit diagram for the main circuit of the transmitter shown in FIG. 1.

FIG. 4 is a circuit diagram illustrating the modulation amplifier 6, the orthogonal modulator 7, and the distortion reducing circuit 11.

A progressive wave from the directive coupler 9 shown in FIG. 2 is demodulated to an I signal and a Q signal by the demodulator 12, and the signals are amplified by an amplifier 13Q and an amplifier 13I and supplied together with a base band I signal and a base band Q signal via input terminals E, F from the D/A convertor to modulation amplifiers 6Q and 6I respectively. The I signal and Q signal amplified by a modulation amplifier respectively are subjected to orthogonal modulation by the orthogonal modulator 7, and are sent from the output terminal p to the input terminal p of the pre-driver amplifier 22 shown in FIG. 3.

Figure 5:
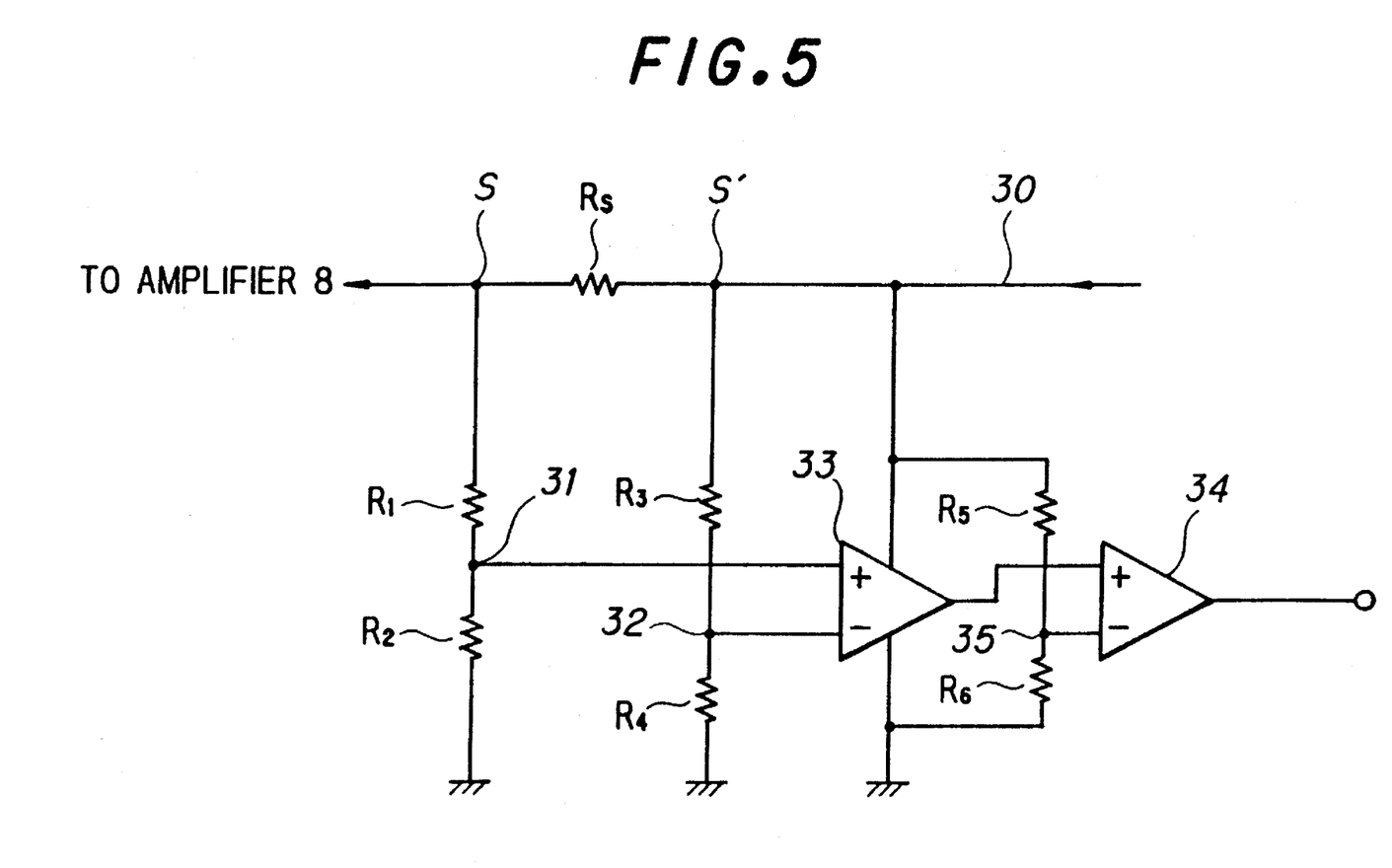
FIG. 5 is a circuit diagram for the abnormal transmission stopping circuit of the transmitter shown in FIG. 1.

FIG. 5 is a circuit diagram illustrating an abnormal transmission stopping circuit 25 a direct current resistor $R_s$ is inserted into a direct current power cable 30. At both edges S, S' of the resistor $R_s$ are provided a voltage dividing circuit comprising resistors $R_1$, $R_2$ and a voltage dividing circuit comprising resistors $R_3$, $R_4$. Contact points 31, 32 of these voltage dividing circuits are connected to a + input terminal and a − input terminal of an operational amplifier 33. The electric current detecting resistor $R_s$, voltage dividing circuits $R_1$, $R^2$, $R_3$, $R_4$, and operational amplifier 33 constitute the electric current detecting circuit 26.

An output terminal of the operational amplifier 33 is connected to a + input terminal of a comparator 34, while the − input terminal of the comparator 34 is connected to a contact point 35 of a voltage dividing circuit comprising resistors $R_5$, $R_6$ each connected to the power cable 30, thus a threshold value voltage being given.

In the abnormal transmission stopping circuit 25 as described above, when a transmission current flows through the transmission amplifier 8, a voltage difference is generated between both the edges S, S' of the electric current detecting resistor $R_s$. A voltage at each of the edges S, S' is divided by the voltage dividing circuits $R_1$, $R_2$, $R_3$, $R_4$ and inputted to a differential input terminal of the operational amplifier 33.

When the transmission current is flowing, the voltage at the edge S becomes lower than that at the edge S'. The voltage difference between S and S' is amplified by the operational amplifier 33, and when the transmission current exceeds a prespecified value, the comparator 34 supplies a transmitting function stopping signal to the base band signal circuit 4 to stop transmission.

In the current detecting circuit described above, an electric current is detected by using a resistor, but also current detection can be made by using, for instance, a hole element.

An embodiment of the present invention was described above, but the present invention is especially suited to a transmitter based on a linear modulation system generally called an SSB (Single side band) transmission system such as TONE IN BAND. For, in the SSB system, a transmission current is zero (0) if the linear system is an ideal one, and the transmission current changes linearly during modulation in proportion to amplitude of voice.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An abnormal transmission stopping circuit for a transmitter based on an orthogonal amplitude modulation system, said transmitter having an orthogonal modulator and a transmission amplifier coupled in series, and a distortion reducing circuit connected in feed back relation between an output of the transmission amplifier and an input of the orthogonal modulator, wherein when a balance in the orthogonal modulator is lost and a local carrier is transmitted with full power, unnecessary electric waves are transmitted, other communications are disrupted, and transmission current in said transmitter increases, said stopping circuit comprising:

an electric current detecting circuit for detecting the transmission current in said transmission amplifier; and a comparator which generates a transmitting function stopping signal when said transmission current detected by said electric current detecting circuit exceeds a threshold value.

2. An abnormal transmission stopping circuit for a transmitter based on an orthogonal modulation system having a base band signal processing circuit, a modulation amplifier, an orthogonal modulator and a transmission amplifier coupled in series, and a distortion reducing circuit connected in feed back relation between an output of the transmission amplifier and an input of the orthogonal modulator, wherein when a balance in the orthogonal modulator is lost and a local carrier is transmitted with full power, unnecessary electric waves are transmitted, other communications are disrupted, and a power supply current to said transmission amplifier increases, said stopping circuit comprising:

an electric current detecting circuit which detects said power supply current to said transmission amplifier; and a comparator which generates and supplies a transmitting function stopping signal to said base band signal processing circuit when said electric current detected by said electric current detecting circuit exceeds a threshold value.

3. An abnormal transmission stopping circuit which stops transmission of unnecessary electric waves due to abnormal operation of a transmitter based on an amplitude modulation system having a base band signal processing circuit and a transmission amplifier comprising:

an electric current detecting circuit which detects a power supply current to said transmission amplifier; and a comparator which generates and supplies a transmitting function stopping signal to said base band signal processing circuit when said electric current detected by said electric current detecting circuit exceeds a threshold value, wherein said electric current detecting circuit comprises a resistor in series with a power supply line to said transmission amplifier;

a first and a second voltage dividing circuit connected to a first and a second end of said resistor, respectively; and an operational amplifier having first and second input terminals for receiving voltages divided by said first and second voltage dividing circuits, respectively.

4. An abnormal transmission stopping circuit for a transmitter according to claim 3, wherein said amplitude modulation system is based on an orthogonal modulation system.

5. An abnormal transmission stopping circuit for a transmitter according to claim 3, further comprising:

a third voltage dividing circuit connected to said second end of said resistor for generating a voltage representing said threshold value, each of said first, second and third voltage dividing circuits comprising a first and second resistor connected in series, and wherein said comparator which generates and supplies a transmitting stopping signal comprises an operational amplifier responsive to an output of said third voltage dividing circuit and an output of said operational amplifier of said current detecting circuit.

6. A method for protecting transmitter in an orthogonal modulation system against fault where a modulation function is accidentally disabled and a local carrier is transmitted with full power, comprising the steps of:

supplying a signal from an amplitude modulator to an RF power amplifier, supplying an electric current from a power source to said RF power amplifier, detecting said electric current from said power source to said power amplifier, and stopping the supply of said signal from said amplitude modulator to said RF amplifier when said detected electric current exceeds a threshold value.

7. An abnormal transmission stopping circuit for a transmitter which stops transmission of unnecessary electric waves due to abnormal operation of said transmitter based on an amplitude modulation system comprising:

an electric current detecting circuit for detecting a transmission current in said transmitter; and a comparator which generates a transmitting function stopping signal when said transmission current detected by said electric current detecting circuit exceeds a threshold value, wherein said electric current detecting circuit comprises a resistor in series with a power supply line supplying power to said transmitter;

a first and a second voltage dividing circuit connected to a first and a second end of said resistor, and an operational amplifier having first and second input terminals for receiving voltages divided by said first and second voltage dividing circuits, respectively.

8. An abnormal transmission stopping circuit for a transmitter according to claim 7, wherein said amplitude modulation system is based on an orthogonal modulation system.

* * * * *